3,168,555
PRODUCTION OF ALKYL SULFONATES
Everett Clippinger, San Rafael, and Richard G. McKee, Berkeley, Calif., assignors to California Research Corporation, San Francisco, Calif., a corporation of Delaware
No Drawing. Filed Jan. 4, 1960, Ser. No. 47
2 Claims. (Cl. 260—513)

The present invention relates to a process for the addition of bisulfite ions to olefins to produce alkyl sulfonates. More particularly, the invention has to do with the use of cumene hydroperoxide as the reaction initiator.

In U.S. Patent No. 2,504,411 there is disclosed and claimed a process for the production of alkyl sulfonates by the addition, at elevated temperatures, of bisulfite ions to olefins in the presence of a reaction initiator and a mutual solvent. In accordance with the patent, the reaction initiator is of the formula R—O—O—R in which both R's are organic radicals, at least one of which is connected to the peroxy group by a carbon atom bonded to three carbon atoms. Compounds in which neither of the R's is tertiary, as represented by benzoyl peroxide, are indicated to be ineffective. The amount of initiator allegedly can range from 0.001 to 0.1 mol per mol of olefin, it being stated that, while more initiator may be used, little increase in yield is realized. Further, the patent exemplifies reaction temperatures of 75° C. to 120° C. and describes the mutual solvent as comprising organic polar solvents including primary alcohols having fewer than 4 carbon atoms, cyclic diethers, and organic amines, the amount of solvent being employed in proportions of 0.75 to 1.5 volumes for each volume of olefin.

It is not surprising that the aforesaid patent is limited to the type of peroxy compounds above described, i.e., in which the peroxy oxygens are both attached to organic radicals. Hydroperoxides are readily reduced by a reducing agent, such as inorganic bisulfite, thus destroying their reaction-initiating effect. Indeed, a standard method for analysis of hydroperoxides involves reducing the hydroperoxide with refluxing alcoholic inorganic sulfite, followed by titration of excess sulfite with iodine.

It has now been found that cumene hydroperoxide can be successfully employed as reaction-initiating agent for the addition of bisulfite ions to olefins to produce alkyl sulfonates in essentially quantitative yields. In addition to the unexpected nature of the invention, the invention possesses a substantial economic advantage, since the peroxy compounds above-mentioned are considerably more expensive than cumene hydroperoxide, which is inexpensive and available in abundant quantities from phenol-making processes which involve the step of making cumene hydroperoxide.

More specifically, the invention involves a process for the preparation of alkyl sulfonates by the addition of bisulfite ions to an olefin in the presence of cumene hydroperoxide and a mutual solvent under conditions of temperature and amounts of hydroperoxide which are regarded as critical. That is, it has been observed that while reaction temperatures of the prior art can apparently be varied over a wide range, little reaction occurs with cumene hydroperoxide at temperatures exceeding about 70° C. and at temperatures below about 30° C., the preferred temperature being in the range 50° C. to 60° C. Similarly, practically no reaction occurs at cumene hydroperoxide concentrations below 0.002 mol per mol of olefin. In addition, while the upper limit of amount of initiator does not appear critical with prior art processes insofar as reaction is concerned, it has been observed that an amount of cumene hydroperoxide exceeding about 0.006 mol per mol of olefin actually impedes reaction so that, with increasing amounts of initiator, reaction rate steadily declines so as to render the process impractical.

In carrying out the invention with cumene hydroperoxide under the conditions above specified, the addition of bisulfite ion is preferably effected in such manner as to maintain in the reaction mixture a bisulfite concentration in the water phase of about 0.1 to 0.2 molar. Control of the addition of bisulfite can be obtained by analyzing aliquots periodically and adjusting the addition rate of the bisulfite accordingly. An amount of bisulfite is added to react with all of the olefin up to 1.2 equivalents of bisulfite per equivalent of olefin. The bisulfite, e.g., ammonium bisulfite, is conveniently added in the form of an aqueous solution of concentration 2 to 5 molar, sufficient water being present during reaction such that the concentration of the ammonium bisulfite is 0.1 to 0.2 molar, as aforesaid. On the other hand, the amount of organic mutual solvent present in the reaction can vary from about 75 to 150 volume percent of the olefin or more.

The olefinic material generally described in the prior art can be employed in the present process and these include pentenes, hexenes, octenes, octadienes, decenes, tetradecene, hexadecene and octadecene, the naphthenes and cycloalkenes, for example, cyclopentene, cyclohexenes, ethylcyclohexenes, cyclohexadienes, pentylcyclohexene, the alkenylaryl hydrocarbons, e.g., styrene, butenyl, benzenes, hexenylbenzenes, etc. Of particular utility are the α-olefins, and preferably primary normal aliphatic 1-olefin of 5 to 20 carbon atoms in the molecule, the sulfonate of which is a primary sulfonate highly useful as detergent material. These 1-olefins of 5 to 20 carbon atoms can advantageously be obtained from the cracking of petroleum wax and suitable petroleum distillates. It may be found advantageous to pretreat the olefinic material prior to reaction to remove undesirable impurities. This may be effected by passing the olefin feed over or through absorbent material, e.g., silica gel. Generally, a silica gel treatment by adsorption of about 1 to 5 volume percent of olefin feed will result in a satisfactory feed for the bisulfite addition reaction herein contemplated.

As mutual solvents in addition to alcohols, such as methanol, ethanol, iso- and n-propanol, other materials known to those skilled in the art can be employed. These include the nitrogen-containing compounds, such as pyridine, hexanolamine, diethylamine, aniline, N-methylaniline, N-methyl-N-ethylaniline, propylamine, pentylamine, dipropylamine, methylethylamine, N-methyl-para-toluidine; the cyclic ethers, such as dioxane and tetrahydrofuran.

While, as above suggested, the best source of bisulfite ion is ammonium bisulfite, other sources for bisulfite ion heretofore employed in the bisulfite addition reaction are satisfactory. Accordingly, for certain purposes sodium bisulfite, calcium bisulfite and magnesium bisulfite may be found satisfactory.

Similarly, pH is not critical to the invention, it having been found that maintenance of pH in the aqueous phase during reactions is advantageous and represents an important refinement feature of the invention. In general, it is preferred to operate with a pH of about 7.0 to 8.5 in the aqueous phase. This may be accomplished by the addition of a basic material, e.g., sodium or ammonium hydroxide, to the bisulfite solution in an amount calculated to give the desired pH.

It is often also advantageous to effect reaction in the presence of a small amount of preformed sulfonate, as from a preceding run. Accordingly, a small amount of preformed sulfonate up to about 15 mol percent, based on olefin to be reacted, will be found advantageous.

Following reaction, recovery of the sulfonate can simply be effected by evaporating or boiling off the solvent, e.g., alcohol, and the water. Following reaction, a de-oiling step can be performed to remove unreacted hydrocarbons. These can be removed by extraction with a light hydrocarbon, e.g., pentane, or by dilution with water to effect phase formation of the oil and sulfonate, followed by separation of the phases as by decantation. Alcohol and water can then be removed from the sulfonate layer by heating to distill off or evaporate the solvent and water.

The critical relationship between temperature and reaction initiating effect of cumene hydroperoxide is based on a number of experiments in which the only variable is temperature. These experiments are tabulated below, in which the original charge was 80.8 g. comprised of 0.4 mol of $C_{10}$–$C_{20}$ essentially 1-olefins obtained from the cracking of petroleum wax and having a molecular weight of 202, 128 ml. of absolute ethanol, 46.6 ml. of water, and 28.3 ml. of 1.41 molar sulfonate from dodecene-1 prepared from a previous experiment. The charge was brought to the reaction temperatures noted in the table, whereupon 10% of the ammonium bisulfite solution (4.78 molar $NH_4HSO_3$ with 5% excess concentrate $NH_4OH$ added) was added initially, and the remaining $NH_4HSO_3$ added at a rate to give 0.15 molar concentration of $NH_4HSO_3$ in the reaction mixture. The total $NH_4HSO_3$ added was 1.2 equivalents, based on olefin charged.

TABLE I

*Ethanol*

| Temperature, °C. | Percent Reaction per Hour | Complete Conversion, Essentially 100% Yield, Hours |
|---|---|---|
| 20 | 1 | Impractically Long. |
| 30 | 10 | 10 hrs. |
| 40 | 13 | 8 hrs. |
| 50 | 15 | 6 hrs. |
| 60 | 10 | 10 hrs. |
| 70 | 5 | 20 hrs. |
| 80 | 1 | Impractically Long. |

In the above table, "Percent Reaction per Hour" indicates the rate of conversion of olefin to sulfonate per hour. Time of essentially complete conversions of all of the olefin to sulfonate to give substantially quantitative yields are shown in the third column.

Similar experiments to those tabulated above were performed employing methanol and n-propanol in equivalent amounts. As expected, rates of reaction and time for complete conversion vary somewhat depending on solvent. Importantly, however, the temperature range is substantially the same for the different solvents, as shown in the tables below. In the tabulated experiments, essentially the same procedure as employed in Table I was employed for the experiments in Tables II and III in which n-propanol and methanol were used respectively in equivalent amounts to ethanol.

TABLE II

*n-Propanol*

| Temperature, °C. | Percent Reaction per Hour | Complete Conversion, Essentially 100% Yield, Hours |
|---|---|---|
| 40 | 30 | 3 hrs. |
| 50 | 60 | 1⅔ hrs. |
| 60 | 96 | 1 hr. |
| 70 | (¹) | (¹) |
| 80 | <1 | Impractically Long. |

¹ Initiator destroyed by bisulfite.

TABLE III

*Methanol*

| Temperature, °C. | Percent Reaction per Hour | Complete Conversion, Essentially 100% Yield, Hours |
|---|---|---|
| 30 | <1 | Impractically Long. |
| 40 | 3 | Do. |
| 50 | 4 | Do. |
| 60 | 7 | 20 hrs. |
| 70 | (¹) | (¹) |
| 80 | <1 | Impractically Long. |

¹ Initiator destroyed by bisulfite.

A number of experiments conducted substantially as described above at 50° C. and in the presence of ethanol as mutual solvent, but varying the amount of cumene hydroperoxide initiator, are tabulated in Table IV.

TABLE IV

| Mols cumene hydroperoxide per mol olefin: | Percent reaction per hour |
|---|---|
| 0 | 0 |
| 0.0023 | 12 |
| 0.0030 | 16 |
| 0.0065 | 15 |
| 0.0266 | 9 |

The table indicates that a concentration of cumene hydroperoxide within the range of 0.002 to 0.006 mol per mol of olefin are the practical amounts required to complete the reaction. Thus, beyond a concentration of 0.006, excess hydroperoxide not only decreases reaction rate, but also represents a waste of cumene hydroperoxide as such.

The following example further illustrates the practice of the invention:

n-Propanol (320 ml.), water (120 ml.) and $C_{10-20}$ cracked wax olefin (262.3 ml.) are charged to a glass reaction flask equipped with glass paddle stirrer, thermometer and addition funnel. The temperature is raised to 50° C., mixture is stirred and 10–15% of the total ammonium bisulfite (total=300 ml. 4.0 molar ammonium bisulfite) is added all at once with the remainder added over a two-hour period. Six-tenths milliliter of cumene hydroperoxide is added initially; additional 0.125 ml. increments of CHP are added as the reaction slows. The bisulfite concentration in the reaction mixture is kept between 0.10 and 0.20 molar by analyzing aliquots every ten minutes and adjusting the addition rate of the aqueous bisulfite. Total reaction time, two and one-half hours, 97% reaction based on assumption of 96% pure olefin. De-oiling was effected by adding an additional 25 volume percent of water (230 ml.) to the final reaction mix and extracting three times with n-pentane.

We claim:

1. Process for the preparation of an alkyl sulfonate which comprises adding a 2–5 molar solution of a bisulfite salt to a primary normal 1-olefin of 5–20 carbon atoms in the presence of cumene hydroperoxide and a water-alcohol mutual solvent, said alcohol being selected from the group consisting of methanol, ethanol, and n-propanol, the amount of cumene hydroperoxide ranging from about 0.002 to 0.006 mol per mol of olefin, maintaining the temperature in the range 30° C. to 70° C., and the bisulfite ion concentration of 0.1 to 0.2 molar during reaction, and continuing the reaction until bisulfite salt has been added in an amount at least sufficient to react with all of the olefin.

2. Process according to claim 1 wherein the pH is maintained between about 7.0 and 8.5.

(References on following page)

References Cited in the file of this patent

UNITED STATES PATENTS

| | | |
|---|---|---|
| 2,318,036 | Werntz | May 4, 1943 |
| 2,504,411 | Harman | Apr. 18, 1950 |
| 2,694,701 | Blum et al. | Nov. 16, 1954 |
| 2,738,341 | Ayers | Mar. 13, 1956 |
| 3,008,918 | Stanton et al. | Nov. 14, 1961 |
| 3,084,186 | Clippinger | Apr. 2, 1963 |

OTHER REFERENCES

Houben-Weyl: Methoden der Organischen Chemie, vol. VIII, pages 72, 78 (1952).